United States Patent
Schultz

(10) Patent No.: US 7,173,539 B2
(45) Date of Patent: Feb. 6, 2007

(54) CONDITION ASSESSMENT SYSTEM AND METHOD

(75) Inventor: Paul C. Schultz, Lake Worth, FL (US)

(73) Assignee: Florida Power and Light Company, Juno Beach, FL (US)

( * ) Notice: Subject to any disclaimer, the term of this patent is extended or adjusted under 35 U.S.C. 154(b) by 190 days.

(21) Appl. No.: 10/955,234

(22) Filed: Sep. 30, 2004

(65) Prior Publication Data

US 2006/0071800 A1 Apr. 6, 2006

(51) Int. Cl.
*G08B 21/00* (2006.01)
(52) U.S. Cl. .................. 340/603; 340/614; 251/289
(58) Field of Classification Search ............... 340/603
See application file for complete search history.

(56) References Cited

U.S. PATENT DOCUMENTS

| | | | |
|---|---|---|---|
| 3,882,305 A | 5/1975 | Johnstone | |
| 4,976,144 A | 12/1990 | Fitzgerald | |
| 5,115,406 A | 5/1992 | Zatezalo et al. | |
| 5,197,328 A | 3/1993 | Fitzgerald | |
| 5,210,704 A | 5/1993 | Husseiny | |
| RE34,559 E | 3/1994 | Mickowski | |
| 5,485,491 A | 1/1996 | Salnick et al. | |
| 5,549,080 A | 8/1996 | Uchikawa | |
| 5,563,351 A | 10/1996 | Miller | |
| 5,566,092 A | 10/1996 | Wang et al. | |
| 5,587,931 A | 12/1996 | Jones et al. | |
| 5,602,757 A | 2/1997 | Haseley et al. | |
| 5,602,761 A | 2/1997 | Spoerre et al. | |
| 5,628,229 A | 5/1997 | Krone et al. | |
| 5,649,449 A | 7/1997 | Algers | |
| 5,748,508 A | 5/1998 | Baleanu | |
| 5,864,773 A | 1/1999 | Barna et al. | |
| 5,960,214 A | 9/1999 | Sharpe, Jr. et al. | |
| 5,986,553 A * | 11/1999 | Young | 340/606 |
| 6,017,143 A | 1/2000 | Eryurek et al. | |
| 6,195,621 B1 | 2/2001 | Bottomfield | |
| 6,199,018 B1 | 3/2001 | Quist et al. | |
| 6,205,409 B1 | 3/2001 | Zvonar | |
| 6,246,950 B1 | 6/2001 | Bessler et al. | |
| 6,249,755 B1 | 6/2001 | Yemini et al. | |
| 6,260,004 B1 | 7/2001 | Hays et al. | |
| 6,298,454 B1 | 10/2001 | Schleiss et al. | |
| 6,317,701 B1 | 11/2001 | Pyotsia et al. | |

(Continued)

OTHER PUBLICATIONS http://plantweb.emersonprocess.com/news/210_ams-coverage.asp; "PlantWeb News," Apr. 20, 2004, pp. 1-7, Emerson Process Management.

*Primary Examiner*—Daniel Wu
*Assistant Examiner*—George A. Bugg
(74) *Attorney, Agent, or Firm*—Michael Best & Friedrich LLP

(57) ABSTRACT

System and method for monitoring and controlling one or more valves. The method can include sensing a condition of a valve, transmitting the condition to a sensor server, and transmitting a data stream including the condition to an assessment application. The method can also include generating a predictive model and comparing the condition to the predictive model. The method can further include transmitting a control instruction to at least one of a valve positioner and the sensor server and varying the position of the valve based on the control instruction.

87 Claims, 3 Drawing Sheets

U.S. PATENT DOCUMENTS

| | | | |
|---|---|---|---|
| 6,330,525 B1 | 12/2001 | Hays et al. | |
| 6,393,373 B1 | 5/2002 | Duyar et al. | |
| 6,404,344 B1 * | 6/2002 | Young | 340/606 |
| 6,445,963 B1 | 9/2002 | Blevins et al. | |
| 6,480,810 B1 | 11/2002 | Cardella et al. | |
| 6,519,552 B1 | 2/2003 | Sampath et al. | |
| 6,556,950 B1 | 4/2003 | Schwenke et al. | |
| 6,557,118 B2 | 4/2003 | Schleiss et al. | |
| 6,587,108 B1 | 7/2003 | Guerlain et al. | |
| 6,594,620 B1 | 7/2003 | Qin et al. | |
| 6,618,630 B1 | 9/2003 | Jundt et al. | |
| 6,625,569 B2 | 9/2003 | James et al. | |
| 6,633,782 B1 | 10/2003 | Schleiss et al. | |
| 6,721,609 B1 | 4/2004 | Wojsznis et al. | |
| 6,748,341 B2 | 6/2004 | Crowder, Jr. | |
| 6,760,716 B1 | 7/2004 | Ganesamoorthi et al. | |
| 6,845,306 B2 | 1/2005 | Henry et al. | |
| 6,975,219 B2 * | 12/2005 | Eryurek et al. | 340/517 |
| 2002/0029130 A1 | 3/2002 | Eryurek et al. | |
| 2002/0163427 A1 | 11/2002 | Eryurek et al. | |
| 2002/0169582 A1 | 11/2002 | Eryurek et al. | |
| 2003/0028268 A1 | 2/2003 | Eryurek et al. | |
| 2003/0139908 A1 | 7/2003 | Wegerich et al. | |
| 2003/0216879 A1 | 11/2003 | Hashemian | |
| 2004/0117766 A1 | 6/2004 | Mehta et al. | |
| 2005/0126296 A1 * | 6/2005 | Hedtke | 73/706 |

* cited by examiner

CONDITION ASSESSMENT SYSTEM AND METHOD

BACKGROUND OF THE INVENTION

As manufacturing systems become more automated, control mechanisms that monitor and regulate the numerous components, such as controllable valves, become more important and prominent. Many current manufacturing systems employ a large number of control mechanisms that monitor operating parameters, such as flow through valves, to ensure that the system performs as desired.

If one or more components of a manufacturing system fail, the operation of the entire manufacturing system can suffer. Failing components can cause significant damages or unwanted modifications to the output of the manufacturing system or to other components of the manufacturing system. In some situations, the damages or modifications can be dangerous.

SUMMARY OF THE INVENTION

Embodiments of the invention provide a system for monitoring a condition of a valve. The system can include a valve having a variable position. The system can also include a valve positioner that receives a control instruction, that varies the position of the valve, that determines a condition of the valve, and that transmits the condition. The system can further include a sensor server that receives the condition, that transmits a data stream including the condition, that receives the control instruction from a control system, and that transmits the control instruction to the valve positioner. The system can still further include an assessment application that receives the data stream and that assesses the condition of the valve by comparing the data stream to a predictive model.

Some embodiments of the invention provide a method of monitoring and controlling a valve. The method can include sensing a condition of the valve, transmitting the condition to a sensor server, and transmitting a data stream including the condition to an assessment application. The method can also include generating a predictive model and comparing the condition to the predictive model. The method can further include transmitting a control instruction from a control system to at least one of a valve positioner and the sensor server and varying the position of the valve based on the control instruction.

DETAILED DESCRIPTION

Figure 1:
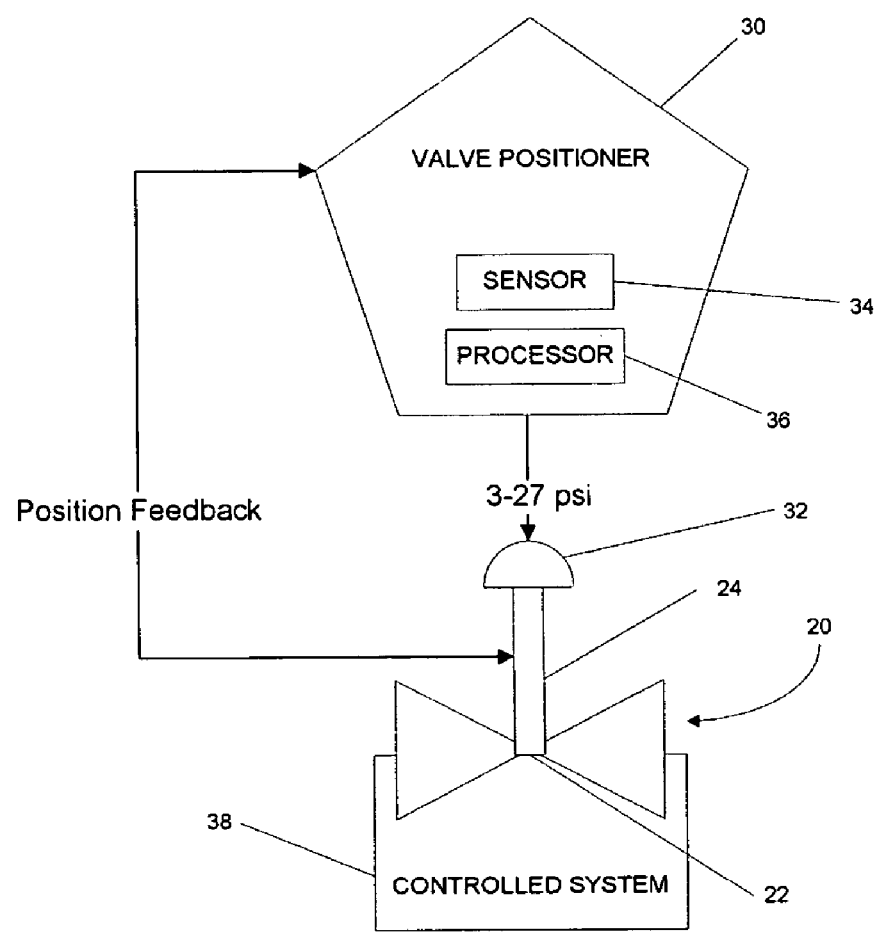
FIG. 1 is a schematic illustration of a control mechanism for monitoring the operation of a valve according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

FIG. 1 illustrates a valve 20 and a control mechanism embodied by a valve positioner 30 that monitors the operation of the valve 20. The valve 20 can include a valve opening 22 and a valve plug 24. The valve 20 can be a component of a controlled system 38, such as a power plant, an assembly line, a feedwater heater, a steam turbine, fuel-control valves and spray valves, or another type of system that has regulated inputs, outputs, and/or operations. The valve 20 can be a steam release valve for releasing steam generated by a turbine. The valve 20 can also be a flume control, fuel injector, or other liquid valve that controls the amount of liquid supplied to a piece of machinery. In general, the valve 20 can be any suitable type of valve that regulates the amount of substance entering or leaving the controlled system 38. The position of the valve plug 24 within the valve opening 22 can be adjusted to change the size of the valve opening 22, and as a result, the amount of substance that is allowed into or out of the controlled system 38. It should be understood that other constructions for the valve 20 are possible. For example, the valve 20 can include a flume or input/output channel and a pinch or wrench that block or allow flow through the flume.

The valve positioner 30 can vary the position of the valve 20. The valve positioner 30 can be a digital valve positioner. In some embodiments, the valve positioner 30 can receive an analog control signal (which can include a control instruction as further described below) and can output a digital feedback signal regarding the operation of the valve 20 and/or the control system 38. In other words, the valve positioner 30 can be controlled by an analog control signal or control instruction and can provide a digital feedback signal. In comparison to an analog signal, the digital feedback signal may contain more information and can often transmit information more efficiently. For example, the digital feedback signal can take advantage of network bandwidth or related baud rate to provide more information per transmission. The quality and integrity of the data contained in the feedback signal can also be better ensured using a digital signal.

In some embodiments, the valve positioner 30 can include an actuator 32, a sensor 34, and a processor 36. The actuator 32 can apply a pressure or a force to the valve 20, or in particular, to the valve plug 24, in order to vary the position of the valve plug 24 and vary the opening of the valve 20. For example, the valve 20 can include a pneumatic linear actuator (including a spring and a diaphragm) that applies a force to move the valve plug 24. In some embodiments, the actuator 32 can apply approximately 3 to 27 pounds per square inch of pressure to the valve 20. Other amounts of pressure can be applied by the valve positioner 30, depending on the characteristics of the valve 20. For example, in some embodiments, the valve positioner 30 via the actuator 32 can also adjust the opening of the valve 20 through mechanisms other than applying pressure. In one embodiment, the valve positioner 30 via the actuator 32 can apply torque to the valve plug 24 in order to turn the valve plug 24 and adjust the rotational position of the valve plug 24 in the valve opening 22. The actuator 32 can include a solenoid or an air pressure applicator that adjusts the position of the valve plug 24 in the valve opening 22. In general, the actuator 32 can include any device that can receive and apply a pressure or a force to change the valve opening 22.

The sensor 34 of the valve positioner 30 can obtain a condition of the valve 20. The term "condition" as used herein and in the appended claims can include one or more of the feedback parameters or information discussed below (e.g., position, applied pressure, received pressure, temperature, emissions, cycles, etc.). It should also be understood by one of ordinary skill in the art that multiple sensors performing various individual functions can be included in the sensor 34. Also, in some embodiments, a single sensor 34 can perform multiple functions. In some embodiments, the condition of the valve 20 can include up to 12 separate signals acquired from the valve positioner 30.

For example, in some embodiments, the sensor 34 can sense a position condition of the valve 20 that specifies the physical position of the valve plug 24 in the valve opening 22. In some embodiments, the sensor 34 can sense a distance traveled condition of the valve plug 24. The distance traveled condition can indicate the total amount of movement the valve plug 24 has made. The distanced traveled condition can indicate over a period of time how often and how much the position of the valve plug 24 changes. In some embodiments, the sensor 34 can sense an applied pressure condition (or position demand condition) of the valve 20. The applied pressure condition can indicate the amount of pressure applied to the valve plug 24 by the actuator 32 (e.g., pressure from an air supply). In some embodiments, the sensor 34 can determine a corresponding received pressure condition (or valve stem feedback condition) that identifies the amount of pushback pressure presented by the valve plug 24. The pushback pressure results from the pressure present inside the controlled system 38 being regulated by the valve 20. For example, the valve 20 can control the release of steam generated by a turbine. The steam generated and contained within the turbine can create pushback pressure on the valve 20 that can, in some embodiments, be sensed by the sensor 34.

In some embodiments, the sensor 34 can sense a temperature condition of the valve 20 (e.g., a temperature of the valve positioner 30). The temperature condition can represent a temperature of the valve 20 or another component whose temperature influences the operation of the valve 20.

In some embodiments, the sensor 34 can sense emission conditions. Emission conditions can indicate the flow rate or amount of substance released through the valve 20. Emission conditions can also indicate other characteristics of the released substance, such as chemical compositions. Additional or alternative conditions can be sensed by the sensor 34 of the valve positioner 30, such as cycle conditions that count the number of changes the position of the valve 20 goes through, and/or time conditions that indicate a percentage of time that the valve 20 is considered opened and/or closed. Depending on the type of controlled system 38 and the type of valve 20, other feedback conditions can alternatively be detected by the sensor 34.

The processor 36 of the valve positioner 30 can process the condition sensed by the sensor 34 before transmitting the condition to another system, application, or device. The processor 36 can also process received instructions or signals from other systems, applications, or devices. The processor 36 can receive incoming signals, process the signals to determine the requested action, and can communicate with the actuator 32 or the sensor 34 to operate according to the received signals. The processor 36 can also be configured to perform internal processing or logic to determine error conditions or an erroneous sensed condition or operation.

Figure 2:
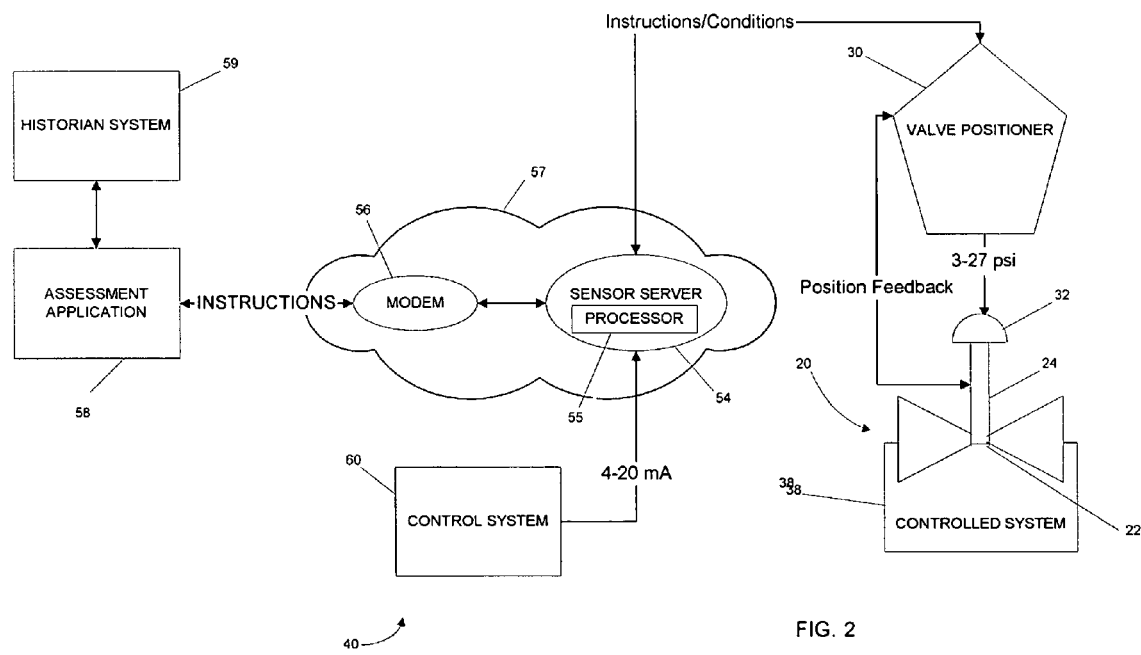
FIG. 2 is a schematic illustration of a control system for monitoring and controlling the operation of a valve according to one embodiment of the invention.

FIG. 2 illustrates a system 40 for monitoring and controlling the operation of the valve 20 with respect to the controlled system 38. The system 40 can include the valve 20, the valve positioner 30, a sensor server 54 including a processor 55, a modem 56, a network 57, an assessment application 58, a historian system 59, and a control system 60. In some embodiments, the condition sensed by the sensor 34 of the valve positioner 30 can be transmitted to the sensor server 54 in a data stream having a particular format or protocol. For example, the data stream can be transmitted to the sensor server 54 using the Highway Addressable Remote Transducer ("HART") protocol. The HART protocol is a common communication protocol for "smart" field instruments. The HART protocol uses 1200 baud Frequency Shift Keying (FSK) based on the Bell 202 standard to superimpose digital information on a 4 to 20 milliamp analog control signal. The analog control signal that includes superimposed digital data allows the HART protocol to be used with analog and digital systems, and allows control and feedback to coexist on a single transmission line. In some embodiments, the analog control signal provides control instructions and the superimposed digital data provides feedback data (i.e., the condition of the valve 20).

The sensor server 54 can transmit the data stream including the condition received from the valve positioner 30 (i.e., the digital feedback signal) to an assessment application 58. In some embodiments, the data stream transmitted to the assessment application 58 can be a substantially continuous data stream that provides the condition of the valve 20 in real-time. It should be understood by one of ordinary skill in the art that a substantially continuous data stream can provide the condition periodically as defined by a sampling rate or as averaged over a set time duration. In other words, the condition of the valve 20 is always available to the sensor server 54 whether or not the sensor server 54 obtains and transmits the condition of the valve 20. Providing the condition in real-time can allow the assessment application 58 to substantially continuously monitor the operation of the controlled system 38 and make adjustments quickly and efficiently. Thus, the delay between the time an inefficient or dangerous operating condition exists and corrective action is requested and performed can be minimized. In addition, the assessment application 58 can receive a continuous and current view of the operating conditions of the controlled system 38, or more particularly, the valve 20.

Before transmitting the data stream and/or the control signal, the sensor server 54 can separate the analog control signal from the digital feedback signal. In some embodiments, the control system 60 cannot handle or process digital feedback signals, and the sensor server 54 can remove the digital feedback signal from the analog control signal before transmitting the analog control signal to the control system 60. Similarly, the sensor server 54 can remove the analog control signal from the digital feedback signal before transmitting the digital feedback signal to the assessment application 58.

In some embodiments, intermediary devices or applications, such as the modem 56, can be interfaced within the network 57 between the sensor server 54 and the assessment application 58. The modem 56 can modulate or format the data stream output by the sensor server 53 and received by the assessment application 58. The modem 56 can be a RS232 to RS422 module that converts the data stream from the RS232 protocol to the RS422 protocol and provides increased transmission distance and baud rates. It should be understood by one of ordinary skill in the art that the functionality of the modem 56 can be incorporated in the sensor server 54 and may not be a separate component. Additional intermediary devices, such as routers or gateways, can be connected between the sensor server 54 and the assessment application 58 to transmit the data stream.

The connection between the sensor server 54 and the assessment application 58, and any intermediary devices, can use a Data Access Standard known as Object Linking and Embedding ("OLE") for Process Control ("OPC"). An OPC link follows standardized procedures and protocols to ensure interoperability with preexisting and future devices, systems, and applications. The use of OLE as the basis for a single client/server specification for controlling industrial devices allows any vendor to develop software and applications that can share data and eliminate the proprietary schemes that once forced vendors to develop numerous communications drivers. In some embodiments, the OPC link can provide a substantially continuous data stream that allows the assessment application 58 to perform a real-time analysis of the data stream.

In some embodiments, the assessment application 58 can be executed at a remote location and a system manager can monitor its operation. The condition of the valve 20 can be transmitted from the sensor server 54 to the assessment application 58 over the network 57, such as a local area network ("LAN") or the Internet. The system manager can monitor the condition received by the assessment application 58. In other embodiments, the assessment application 58 can be located in close proximity to the controlled system 38 and/or the valve 20.

The historian system 59 can be a data storage device such as one or more databases, hard-disk drives, etc. The historical data can include past operating trends, operating limits, or additional data that can be referenced to control current operating parameters. In some embodiments, the assessment application 58 can add the condition received from the valve 20, the valve positioner 30, and/or the controlled system 38 to the historian system 59. The assessment application 58 can also forward the condition to other systems or data storage devices through other direct or indirect connections (not shown). In some embodiments, the historian system 59 can be an Enterprise Wide Historian System ("EWHS") that collects historical data from a number of components or controlled systems that comprise a larger manufacturing system.

The assessment application 58 can generate a warning signal if the condition received in the digital feedback signal indicates a situation requiring immediate notification and/or correction. In some embodiments, a warning signal can set a timing device to track the duration of the condition that is indicating a potential failure. In some embodiments, the assessment application 58 can use historical data stored within the historian system 59 to make predictions regarding failures and to generate a warning signal based on those predictions.

In some embodiments, the assessment application 58 can use a predictive model to analyze the condition of the valve 20. The assessment application 58 can generate a predictive model from the data stored in the historian system 59. The predictive model can calculate probable future behavior of the controlled system 38 based on past patterns, and can provide early suggestive actions to avoid system failures or inefficient operation. The predictive model used by the assessment application 58 can also be previously generated. The previously-generated model can be generated by the assessment application 58 or can be previously generated by another application and then referenced by the assessment application 58 as needed. The predictive model can be stored in the historian system 59, the assessment application 58, or another storage device.

The assessment application 58 can use the predictive models to predict failures in the valve 20, the valve positioner 30, the actuator 32, or other components of the controlled system 38. The assessment application 58 can predict a problem before a failure causes an operational issue and/or lost output from the controlled system 38. The assessment application 58 can compare the condition received from the valve positioner 30 to a modeled condition in the predicative model and can calculate a difference. The assessment application 58 can generate an alarm or warning signal if the difference is above a threshold, indicating that the condition is either too high or too low and may lead to a failure. The warning signal can be an audible, visual, or movement (e.g., vibration) signal. The ability to detect incipient changes and provide early detection of failure can provide operational value and can help prevent damages to the valve 20 or to any other portion of the controlled system 38.

The control system 60 can determine operating adjustments and can generate a corresponding control instruction for the controlled system 38 based on the analog control signal received from the valve positioner 30. In one embodiment, the control system 60 includes a Bailey Infi 90 distributed control system (DCS) that produces an analog output. The control system 60 can provide the control instruction to adjust the operation of the controlled system 38. For example, if the valve positioner 30 provides an analog control signal that indicates a high pressure inside the controlled system 38, the valve 20 can be opened to release the built-up pressure. The control system 60 can generate a control instruction, or more particularly a position instruction, to adjust the operation of the valve 20. The position instruction can indicate an amount of pressure or force the valve positioner 30 should apply to the valve 20 in order to achieve the correct position of the valve plug 24. In general, the control system 60 can generate a control instruction that may or may not include a position instruction for the valve 20 and/or the valve positioner 30. For example, rather than a position instruction for altering the position of the valve 20, the control instruction can include a request for more control data and/or an instruction to remain in the current position. In some embodiments, the control instruction can include a request for additional data along with a position instruction.

After generating a control instruction, such as a position instruction, the control system 60 can transmit the control instruction to the sensor server 54. In some embodiments, the transmission line between the valve positioner 30 and the sensor server 54 can be a bi-directional line, and the control instruction generated by the control system 60 can be transmitted over the same transmission line that the data stream including the condition of the valve 20 was transmitted.

Figure 3:
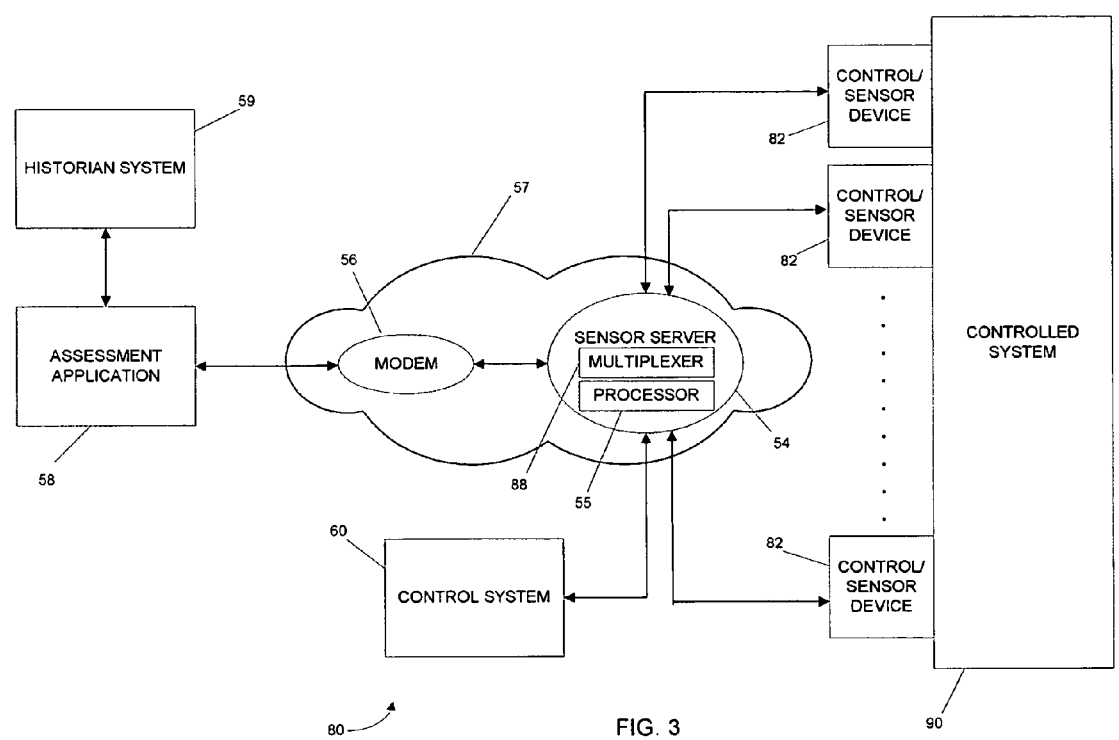
FIG. 3 is a schematic illustration of a control system for monitoring and controlling a plurality of control/sensor devices according to another embodiment of the invention.

When the sensor server 54 receives the control instruction from the control system 60, the processor 55 of the sensor server 54 can process the control instruction and can forward the control instruction to the appropriate valve positioner 30 (e.g., if there is more than one valve positioner connected to the sensor server 24, as shown and described with respect to FIG. 3). If necessary, the sensor server 54, using the processor 55, can format the received control instruction into a control instruction recognized or understood by the valve positioner 30. The valve positioner 30 can be configured to receive control information in a specific format, such as an analog control signal having a range of amperage values, with each value indicating a particular control instruction. In some embodiments, the processor 55 can integrate or convert the control instruction received from the control system 60 into a position instruction recognizable to the valve positioner 30. The control system 60 can provide the processor 55 with a signal, such as an analog control signal ranging between approximately 4 and 20 milliamps, which the processor 55 can use to generate a position instruction for the valve positioner 30.

After performing any necessary formatting, the sensor server 54 can transmit the control instruction to the valve positioner 30. The processor 36 of the valve positioner 30 can receive the control instruction, process the control instruction to receive any position instruction included in the control instruction, and instruct the actuator 32 to adjust the amount of pressure or the force applied to the valve 20 in order to change the position of the valve 20 as indicated by the position instruction. In some embodiments, the processor 36 can error check the control instruction received by the sensor server 54 to ensure that the command will not cause the valve positioner 30 or the valve 20 to operate outside of normal operating parameters. The valve positioner 30, or more particularly the processor 36, can generate a warning if an invalid control instruction is received from the sensor server 54. The warning can be transmitted back to the sensor server 54 and/or the assessment application 58.

FIG. 3 illustrates a control system 80 according to another embodiment of the invention in which the sensor server 54 is connected to two or more control/sensor devices 82, such as two or more valve positioners 30. The control/sensor devices 82 can monitor a controlled system 90 (which can also represent two or more separate controlled systems). Each of the control/sensor devices 82 can monitor a specific part or component of the controlled system 90. Alternatively, two or more of the control/sensor devices 82 can monitor the same part or component to provide redundant observation and control. Each one of the control/sensor devices 82 can generate a condition that can be used to assess the operation of the controlled system 90. To accommodate the control/sensor devices 82, the sensor server 54 can include a multiplexer 88 in addition to the processor 55. The multiplexer 88 can combine the signals from the control/sensor devices 82 so that the data stream can be transmitted in substantially real-time on a single transmission line. It should be understood by one of ordinary skill in the art that a substantially real-time data stream can provide the conditions of the control/sensor devices 82 as sensed at a specific sampling rate, as averaged over a set time duration, or as an adjustment (i.e., increase or decrease) from a previously-sensed condition.

The multiplexer 88 can perform frequency division multiplexing to integrate the various outputs of the control/sensor devices 82 into a single output. Frequency division multiplexing can be used to assign each data source to a different carrier frequency. The assigned carrier frequencies can be sufficiently separated to ensure that the signals, or data channels, do not overlap. Since the output of each control/sensor device 82 is transmitted on its own frequency, each control/sensor device 82 does not wait for other control/sensor devices 82 in order to use the single transmission line. Frequency division multiplexing can be used to provide real-time transmission of data. In some embodiments, the multiplexer 88 included in the sensor server 54 can integrate up to 64 data channels into a single output data stream. In other embodiments, the multiplexer 88 can use other multiplexing techniques, such as time division multiplexing or statistical time division multiplexing.

The conditions from multiple control/sensor devices 82 can be integrated by the multiplexer 88 and can be transmitted to the assessment application 58 over a single transmission line. The assessment application 58 can receive the data stream from the sensor server 54. In addition, upon receiving the control instructions from the control system 60, the sensor server 54 can transmit each of the control instructions to the appropriate control/sensor device 82.

It should be understood by one of ordinary skill in the art that embodiments of the invention can be implemented using various computer devices, such as personal computers, servers, and other devices that have processors or that are capable of executing programs or sets of instructions. In general, the invention can be implemented using existing hardware or hardware that could be readily created by those of ordinary skill in the art. Thus, the architecture of exemplary devices has not always been explained in detail, except to note that the devices will generally have a processor, memory (of some kind), and input and output applications. The processor can be a microprocessor, a programmable logic control, an application specific integrated circuit, or a computing device configured to fetch and execute instructions. In some cases, the devices can also have operating systems and application programs that are managed by the operating systems. It should also be noted that although the control systems 40 and 80 are shown connected in a network, no specific network configuration is implied. One or more networks or communication systems, such as the Internet, telephone systems, wireless networks, satellite networks, cable TV networks, and various other private and public networks, could be used in various combinations to provide the communication links desired or needed to create embodiments or implementations of the invention, as would be apparent to one of ordinary skill in the art. Thus, the invention is not limited to any specific network or combinations of networks.

Various features and advantages of the invention are set forth in the following claims.

The invention claimed is:

1. A system for monitoring a condition of a valve, the system comprising:

a valve having a variable position;

a valve positioner that receives a control instruction, that varies the position of the valve, that determines a condition of the valve, and that transmits the condition;

a sensor server that receives the condition, that transmits a data stream including the condition, that receives a control instruction from a control system, and that transmits the control instruction to the valve positioner; and an assessment application that receives the data stream and that assesses the condition of the valve by comparing the data stream to a predictive model.

2. A system as claimed in claim 1, wherein the data stream transmitted by the sensor server to the assessment application is substantially continuous.

3. A system as claimed in claim 1, wherein the control instruction and the condition are transmitted between the sensor server and the valve positioner on a single transmission line.

4. A system as claimed in claim 1, wherein the condition transmitted by the valve positioner is a Highway Addressable Remote Transducer protocol signal.

5. A system as claimed in claim 1, wherein the sensor server is connected to the assessment application by an Object Linking and Embedding for Process Control link.

6. A system as claimed in claim 1, wherein the valve includes a steam valve.

7. A system as claimed in claim 1, wherein the valve includes a liquid valve.

8. A system as claimed in claim 1, wherein the sensor server includes a multiplexer.

9. A system as claimed in claim 8, wherein the multiplexer establishes a plurality of data channels.

10. A system as claimed in claim 9, wherein the plurality of data channels includes up to sixty-four data channels.

11. A system as claimed in claim 1, wherein the control system generates an approximately 4 to 20 milliamp control instruction.

12. A system as claimed in claim 1, wherein the assessment application generates the predictive model.

13. A system as claimed in claim 12, wherein the assessment application generates the predictive model from historical data.

14. A system as claimed in claim 1, further comprising a modem connected between the sensor server and the assessment application.

15. A system as claimed in claim 14, wherein the modem includes a RS232 to RS422 modem.

16. A system as claimed in claim 1, wherein the assessment application generates a warning signal when the data stream indicates a failure.

17. A system as claimed in claim 1, wherein the valve positioner applies one of a pressure and a force to the valve.

18. A system as claimed in claim 17, wherein the valve positioner applies approximately 3 to 27 pounds per square inch of pressure to the valve.

19. A system as claimed in claim 17, wherein the valve positioner varies the position of a valve plug by changing one of a pressure and a force applied to the valve.

20. A system as claimed in claim 1, wherein the control instruction includes a position instruction.

21. A system as claimed in claim 1, wherein the condition includes at least one of a position condition, an applied pressure condition, a received pressure condition, a temperature condition, an emission condition, and a distance traveled condition.

22. A system as claimed in claim 1, wherein the valve positioner includes a digital positioner.

23. A system for monitoring a condition of each one of a plurality of valves, each one of the plurality of valves having a variable position, the system comprising:

a plurality of valve positioners, each one of the plurality valve positioners determining a condition for each one of the plurality of valves, transmitting the condition, receiving a control instruction, and changing the position of one of the plurality of valves;

a sensor server receiving the condition from each one of the plurality of valve positioners, transmitting a data stream including the condition, receiving the control instruction from a control system, and transmitting the control instruction to one of the plurality of valve positioners; and an assessment application receiving the data stream and assessing the condition of one of the plurality of valves by comparing the data stream to a predictive model.

24. A system as claimed in claim 23, wherein the data stream transmitted by the sensor server is substantially continuous.

25. A system as claimed in claim 23, wherein the control instruction and the condition are transmitted between the sensor server and one of the plurality of valve positioners on a single transmission line.

26. A system as claimed in claim 23, wherein the condition transmitted by each one of the plurality of valve positioners is a Highway Addressable Remote Transducer protocol signal.

27. A system as claimed in claim 23, wherein the sensor server is connected to the assessment application by an Object Linking and Embedding for Process Control link.

28. A system as claimed in claim 23, wherein the system monitors and controls a steam valve.

29. A system as claimed in claim 23, wherein the system monitors and controls a liquid valve.

30. A system as claimed in claim 23, wherein the sensor server includes a multiplexer.

31. A system as claimed in claim 30, wherein the multiplexer establishes a plurality of data channels.

32. A system as claimed in claim 31, wherein the plurality of data channels includes up to sixty-four data channels.

33. A system as claimed in claim 23, wherein the control system generates an approximately 4 to 20 milliamp control instruction.

34. A system as claimed in claim 23, wherein the assessment application generates the predictive model.

35. A system as claimed in claim 34, wherein the assessment application generates the predictive model from historical data.

36. A system as claimed in claim 23, further comprising a modem connected between the sensor server and the assessment application.

37. A system as claimed in claim 36, wherein the modem includes a RS232 to RS422 modem.

38. A system as claimed in claim 23, wherein the assessment application generates a warning signal when the data stream indicates a failure.

39. A system as claimed in claim 23, wherein each one of the plurality of valve positioners applies one of a pressure and a force to the valve.

40. A system as claimed in claim 39, wherein at least one of the plurality of valve positioners applies approximately 3 to 27 pounds per square inch of pressure to the valve.

41. A system as claimed in claim 40, wherein at least one of the plurality of valve positioners varies the position of a valve plug by changing one of a pressure and a force applied to the valve.

42. A system as claimed in claim 23, wherein the control instruction includes a position instruction.

43. A system as claimed in claim 23, wherein the condition includes at least one of a position condition, an applied pressure condition, a received pressure condition, a temperature condition, an emission condition, and a distance traveled condition.

44. A system as claimed in claim 23, wherein at least one of the plurality of valve positioners includes a digital positioner.

45. A method of monitoring and controlling a valve, the method comprising:
   sensing a condition of the valve;
   transmitting the condition to a sensor server;
   transmitting a data stream including the condition to an assessment application;
   generating a predictive model;
   comparing the condition to the predictive model;
   transmitting a control instruction to at least one of a valve positioner and the sensor server; and
   varying the position of the valve based on the control instruction.

46. A method as claimed in claim 45, further comprising transmitting a continuous data stream.

47. A method as claimed in claim 45, further comprising transmitting the condition and the control instruction between the sensor server and the valve positioner over a single transmission line.

48. A method as claimed in claim 45, further comprising transmitting the condition including a Highway Addressable Remote Transducer protocol signal.

49. A method as claimed in claim 45, further comprising establishing an Object Linking and Embedding for Process Control link between the sensor server and the assessment application.

50. A method as claimed in claim 45, further comprising sensing a condition of a steam valve.

51. A method as claimed in claim 45, further comprising sensing a condition of a liquid valve.

52. A method as claimed in claim 45, further comprising transmitting the condition to a multiplexer included in the sensor server.

53. A method as claimed in claim 52, further comprising establishing a plurality of data channels.

54. A method as claimed in claim 53, further comprising assigning the condition to one of the plurality of data channels.

55. A method as claimed in claim 54, further comprising generating an approximately 4 to 20 milliamp control instruction.

56. A method as claimed in claim 45, further comprising generating the predictive model from historical data.

57. A method as claimed in claim 45, further comprising modulating the data stream.

58. A method as claimed in claim 57, further comprising converting the data stream from a RS232 protocol to a RS422 protocol.

59. A method as claimed in claim 45, further comprising generating a warning signal when the data stream indicates a failure.

60. A method as claimed in claim 45, further comprising applying one of a pressure and a force to the valve.

61. A method as claimed in claim 60, further comprising applying an approximately 3 to 27 pounds per square inch of pressure to the valve.

62. A method as claimed in claim 60, further comprising applying one of a pressure and a force to the valve based on the control instruction.

63. A method as claimed in claim 45, further comprising generating a control instruction including a position instruction.

64. A method as claimed in claim 45, further comprising sensing at least one of a position condition, an applied pressure condition, a received pressure condition, a temperature condition, an emission condition, and a distance traveled condition.

65. A method as claimed in claim 45, further comprising generating a digital condition.

66. A system for monitoring a condition of a valve, the system comprising:
   a valve having a variable position;
   a valve positioner that receives a control instruction, that varies the position of the valve, that determines a condition of the valve, and that transmits the condition in a Highway Addressable Remote Transducer protocol signal;
   a sensor server that receives the condition, that transmits a substantially continuous data stream including the condition, that receives a control instruction from a control system, and that transmits the control instruction to the valve positioner, the control instruction and the condition being transmitted between the sensor server and the valve positioner on a single transmission line; and
   an assessment application that receives the substantially continuous data stream over an Object Linking and Embedding for Process Control link and that assesses the condition of the valve by comparing the data stream to a predictive model.

67. Computer readable medium containing instructions for monitoring and controlling a plurality of valves, the instructions comprising:
   determining a condition for each one of the plurality of valves;
   transmitting the condition to a sensor server;
   generating a data stream including the condition for each one of the plurality of valves;
   transmitting the data stream to an assessment application;
   generating a predictive model;
   comparing the data stream to the predictive model;
   transmitting a control instruction from a control system to at least one of the sensor server and a valve positioner; and
   varying the position of the valve based on the control instruction.

68. A computer readable medium as claimed in claim 67, further comprising transmitting a substantially continuous data stream.

69. A computer readable medium as claimed in claim 67, further comprising transmitting the condition and the control instruction between the sensor server and the valve positioner over a single transmission line.

70. A computer readable medium as claimed in claim 67, further comprising transmitting the condition including a Highway Addressable Remote Transducer protocol signal.

71. A computer readable medium as claimed in claim 67, further comprising transmitting the condition over an Object Linking and Embedding for Process Control link.

72. A computer readable medium as claimed in claim 67, further comprising sensing a condition of a steam valve.

73. A computer readable medium as claimed in claim 67, further comprising sensing a condition of a liquid valve.

74. A computer readable medium as claimed in claim 67, further comprising transmitting the condition to a multiplexer.

75. A computer readable medium as claimed in claim 67, further comprising establishing a plurality of data channels.

76. A computer readable medium as claimed in claim 75, further comprising assigning the condition to one of the plurality of data channels.

77. A computer readable medium as claimed in claim 67, further comprising generating an approximately 4 to 20 milliamp control instruction.

78. A computer readable medium as claimed in claim 67, further comprising generating the predictive model from historical data.

79. A computer readable medium as claimed in claim 67, further comprising modulating the data stream.

80. A computer readable medium as claimed in claim 79, further comprising converting the data stream from a RS232 protocol to a RS422 protocol.

81. A computer readable medium as claimed in claim 67, further comprising generating a warning signal when the data stream indicates a failure.

82. A computer readable medium as claimed in claim 67, further comprising applying one of a pressure and a force to the valve.

83. A computer readable medium as claimed in claim 82, further comprising applying approximately 3 to 27 pounds per square inch of pressure to the valve.

84. A computer readable medium as claimed in claim 82, further comprising applying one of a pressure and a force to the valve based on the control instruction.

85. A computer readable medium as claimed in claim 67, further comprising generating a position instruction.

86. A computer readable medium as claimed in claim 67, further comprising sensing at least one of a position condition, an applied pressure condition, a received pressure condition, a temperature condition, an emission condition, and a distance traveled condition.

87. A computer readable medium as claimed in claim 67, further comprising generating a digital condition.

* * * * *